United States Patent
Cherniak et al.

(10) Patent No.: US 9,934,113 B2
(45) Date of Patent: Apr. 3, 2018

(54) ENHANCED CONSOLE ASSISTED RECOVERY FOR A COORDINATED TIMING NETWORK

(71) Applicant: INTERNATIONAL BUSINESS MACHINES CORPORATION, Armonk, NY (US)

(72) Inventors: Stephen P. Cherniak, Bainbridge, NY (US); Donald Crabtree, Port Ewen, NY (US); John S. Houston, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 14/875,008

(22) Filed: Oct. 5, 2015

(65) Prior Publication Data
US 2017/0097874 A1    Apr. 6, 2017

(51) Int. Cl.
*G06F 11/20* (2006.01)
*H04L 29/06* (2006.01)

(52) U.S. Cl.
CPC .......... *G06F 11/2033* (2013.01); *H04L 69/28* (2013.01); *G06F 2201/805* (2013.01)

(58) Field of Classification Search
CPC .............................. G06F 11/2033; H04L 69/28
See application file for complete search history.

(56) References Cited

U.S. PATENT DOCUMENTS

| | | | |
|---|---|---|---|
| 7,539,777 B1 * | 5/2009 | Aitken | H04L 69/16 370/466 |
| 8,924,355 B1 | 12/2014 | Kundzich et al. | |
| 2005/0251603 A1 * | 11/2005 | Ishii | G06F 1/14 710/110 |
| 2008/0183899 A1 * | 7/2008 | Carlson | H04J 3/0641 709/248 |
| 2008/0184060 A1 * | 7/2008 | Carlson | H04J 3/0641 714/4.11 |

(Continued)

FOREIGN PATENT DOCUMENTS

| CN | 101730085 B | 9/2012 |
|---|---|---|
| EP | 2104041 A2 | 9/2009 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Yolanda L Wilson
(74) *Attorney, Agent, or Firm* — Steven S. Chiu, Esq.; Kevin P. Radigan, Esq.; Heslin, Rothenberg, Farley & Mesiti, P.C.

(57) ABSTRACT

An enhanced console assisted recovery capability provides an efficient technique for communicating the failure of a primary time server to the backup time server in order to provide fast failure recovery of a synchronized timing network with the intent of avoiding a complete network outage. The primary time server efficiently notifies the backup time server that the primary time server is about to become unavailable. The backup time server can then begin an immediate takeover of time serving to the synchronized network.

10 Claims, 5 Drawing Sheets

(56) References Cited

U.S. PATENT DOCUMENTS

| | | | |
|---|---|---|---|
| 2009/0238214 A1* | 9/2009 | Hong | H04J 3/0688 370/503 |
| 2009/0259881 A1* | 10/2009 | Carlson | H04L 41/0654 714/4.2 |
| 2010/0100762 A1* | 4/2010 | Carlson | H04L 12/6418 714/4.1 |
| 2013/0318040 A1 | 11/2013 | Park | |
| 2014/0281037 A1* | 9/2014 | Spada | H04L 69/28 709/248 |

OTHER PUBLICATIONS

Anonymous, "Effort Determination and Tracking for Backup Environments Management," IP.com No. IPCOM000219774D, Jul. 12, 2012, pp. 1-8.

IBM, "Immediate Backup Capability in a System with Multiple Backup Servers," IP.com No. IPCOM000191737D, Jan. 13, 2010, pp. 1-5.

Assiotis, Marios, et al., "A Distributed Architecture for MMORPG," '06 Proceedings of 5th ACM SIGCOMM Workshop on Network and System Support for Games—NetGames, Oct. 2006, pp. 1-7.

Zou, Hengming et al., "Real-Time Primary—Backup (RTPB) Replication with Temporal Consistency Guarantees," 18th International Conference on Distributed Computing Systems, May 1998, pp. 48-56.

IBM, "z/Architecture—Principles of Operation," IBM Publication No. SA22-7832-10, Eleventh Edition, Mar. 2015, pp. 1-1732.

* cited by examiner

ENHANCED CONSOLE ASSISTED RECOVERY FOR A COORDINATED TIMING NETWORK

BACKGROUND

One or more aspects relate, in general, to coordinated timing networks, and in particular, to recovery within such networks.

A Coordinated Timing Network (CTN) is a network in which multiple distinct computing systems maintain time synchronization to form the Coordinated Timing Network. Systems in the Coordinated Timing Network employ a message based protocol, referred to as a Server Time Protocol (STP), to pass timekeeping information between the systems over existing, high-speed data links. This enables the time of day (TOD) clocks at each system to be synchronized to the accuracy required in today's high-end computing systems. Since the protocol makes use of technology within a computing system, synchronization accuracy scales as technology improves. A computing system that provides time to other computing systems is referred to as a time server or server herein.

Within a Coordinated Timing Network for STP, there is to be only one server acting as the source of time for the network. If there is more than one time source, the two sources could diverge leading to data integrity exposure. Likewise, if there is no single server acting as the source of time for the network, the clocks on the multiple servers could drift apart, raising a data integrity exposure in that way.

The Server Time Protocol defines a primary time server (PTS) and a backup time server (BTS). Should the primary time server fail in some way, the backup time server takes over as the source of time for the network. However, the takeover process is a very complicated decision. A loss of communication does not necessarily mean that the server is no longer available, but rather it may be a result of a failed communication link.

SUMMARY

Shortcomings of the prior art are overcome and additional advantages are provided through the provision of a computer program product for facilitating recovery in coordinated timing networks. The computer program product comprises a storage medium readable by a processing circuit and storing instructions for execution by the processing circuit for performing a method. The method includes, for instance, detecting, by a primary time server of a coordinated timing network, that it has reached a particular failure condition; and based on detecting the particular failure condition, proactively initiating by the primary time server notification of failure to a backup time server of the coordinated timing network.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, an enhanced console assisted recovery capability is provided. This capability provides an efficient technique for communicating the failure of a primary time server to the backup time server in order to provide fast failure recovery of a synchronized timing network with the intent of avoiding a complete network outage. The primary time server efficiently notifies the backup time server that the primary time server is about to become unavailable. The backup time server can then begin an immediate takeover of time serving to the synchronized network.

The enhanced console assisted recovery technique is contrasted with a previously employed console assisted recovery technique. The console assisted recovery technique assisted the backup time server in determining whether the primary time server was still up and running when coupling traffic ceased. In contrast, with the enhanced console assisted recovery, the primary time server informs the backup time server of its demise. Further details relating to the console assisted recovery are described with reference to FIG. 1.

Figure 1:
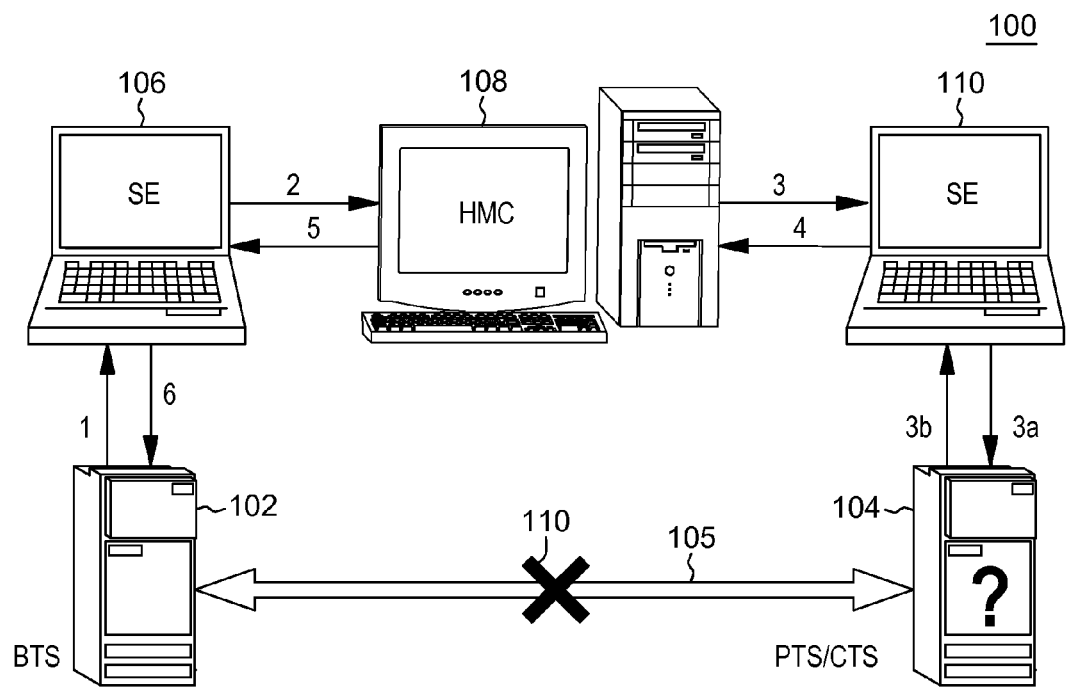
FIG. 1 depicts one example of communication between various servers of a Coordinated Timing Network to provide console assisted recovery.

Referring to FIG. 1, console assisted recovery in a coordinated timing network is initiated by a backup time server to a primary time server if there is a lack of communication between the backup time server and the primary time server. As shown in FIG. 1, a coordinated timing network 100 includes a plurality of servers 102, 104. In this example, server 102 is communicatively coupled 105 to server 104. Server 102 is further coupled to a support element 106, which is further coupled to a hardware management console (HMC) 108. Hardware management console 108 is further coupled to a support element 110, which is coupled to server 104.

As examples, each server is a central electronics complex based on the z/Architecture offered by International Business Machines Corporation (IBM); the hardware management console is, for instance, a personal computer, such as an Intel-based personal computer with a DVD-RAM (digital video disk-random access memory), as a particular example, or other type of computer or processing device that includes functionality to provide a standard interface for configuring and operating partitioned and SMP (Symmetric Multiprocessing) systems, such as System z offered by International Business Machines Corporation; and each support element is, for instance, a workstation coupled to the central processing complex used for monitoring and operating a system. Example hardware management consoles and support elements are based on technology offered by International Business Machines Corporation. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety.

Coordinated timing network 100 includes a primary time server (PTS) as the current time server (CTS), and a backup time server (BTS). In this embodiment, the primary time server includes server 104 coupled to support element 110, and the backup time server includes server 102 coupled to support element 106. Thus, support element 106 is referred to herein as the BTS support element and support element 110 is referred to herein as the PTS support element.

In this example, server 102 has lost 110 communication with server 104; thus communication has been lost between the backup time server and the primary time server. When server 102 of the backup time server detects that it is not receiving a response from server 104 of the primary time server, it requests (1) BTS support element (SE) 106 to send (2) a message requesting status of server 104. This message is sent (3) via hardware management console (HMC) 108 to PTS support element 110. Support element 110 determines whether server 104 is active (3a, 3b) and sends (4) the status to hardware management console 108. Hardware management console 108 then forwards (5) the status to support element 106. Support element 106 then notifies (6) server 102 of the status of the primary time server. The backup time server then takes action depending on the status of the primary time server.

When a server fails, the support element coupled to the failing server may become very busy collecting and logging data to describe the situation at the time of the failure. When this happens, it is possible that the console assisted recovery request may be lost or may take a long time to respond.

One possible solution to this scenario, which is available on selected coupling links, is to use a signal, referred to as a Going Away Signal. When a server is failing, the coupling link adapters can send a signal across the coupling link to the attached server indicating the failure occurred. However, this requires special hardware, which is not available on off-the-shelf adapters. Thus, in accordance with an aspect of the present invention, an enhanced console assisted recovery protocol is provided that does not require special hardware.

The enhanced console assisted recovery uses the server network, as it is used by the consoled assisted recovery solution; however, this approach reverses the initiative, having the support element coupled to the system which is failing take charge of initiating the reporting of the system failure to the backup time server. This allows the support element to send the message before it becomes busy handling data collection and logging, and allows the backup server to take over immediately. Further, it provides the notification without requiring any special hardware.

Figure 2:
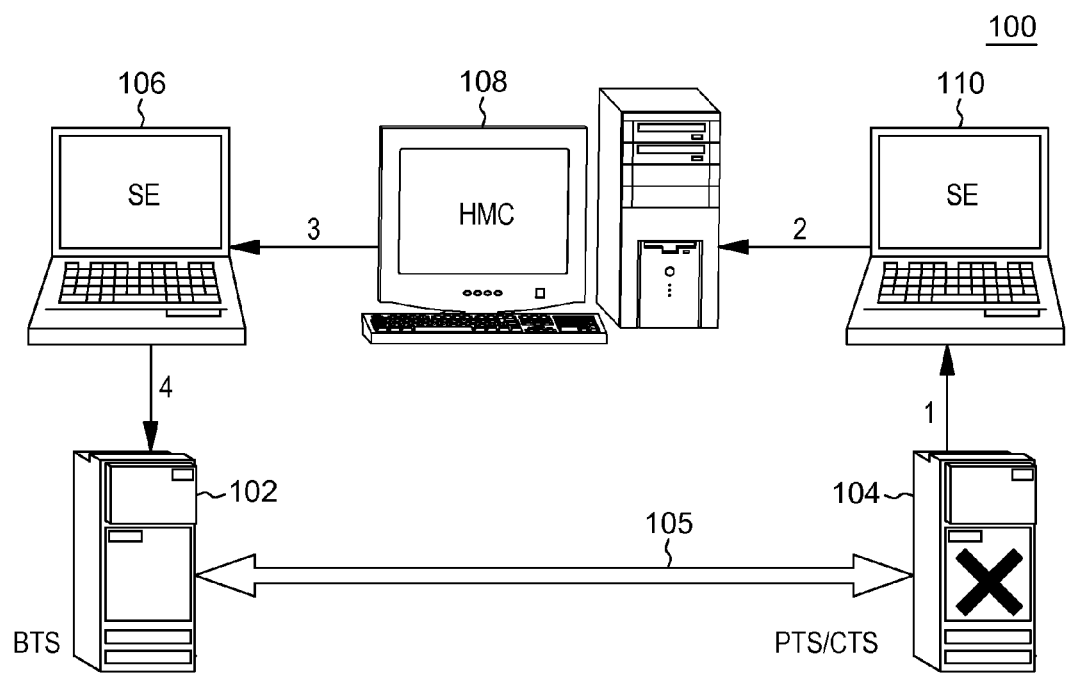
FIG. 2 depicts one example of communication between various servers of the Coordinated Timing Network to provide enhanced console assisted recovery, in accordance with an aspect of the present invention.

One embodiment of an enhanced console assisted recovery procedure is described with reference to FIG. 2. Referring to FIG. 2, in one example, when server 104 detects an error that it cannot recover from, it goes into a check-stop pending condition, and informs (1) its support element 110 of the condition. The PTS support element, in turn, informs (2) hardware management console 108 of the failing condition. Hardware management console 108 then communicates (3) the failure to BTS support element 106 of server 102. Support element 106 then informs (4) server 102 of the failing primary time server.

As a particular example, PTS support element 110 detects the check-stop pending condition and notifies code of the server time protocol executing in support element 110 of the failing condition. Prior to the support element getting busy performing actions to service the condition, such as capturing data and logging information, it sends a recovery request via hardware management console 108 to support element 106 notifying support element 106 of the failing primary time server. Support element 106 then communicates this request to server 102, so that the backup time server can determine whether to initiate takeover as the primary time server. For instance, the backup time server determines from the request that the primary time server has an unrecoverable condition, and then, determines that it will takeover as the primary time server, in a conventional manner. The determination of the failure and the takeover is performed non-disruptively without bringing down the backup time server or any other server in the coordinated timing network.

In one embodiment, the recovery request includes, for instance, a check-stop indicator set to indicate the check-stop condition, an identifier of the coordinated timing network (CTN ID), the stratum level of the server in the coordinated timing network (which in this case is stratum level 1), an identifier of the node going down, and/or other information.

Figure 3:
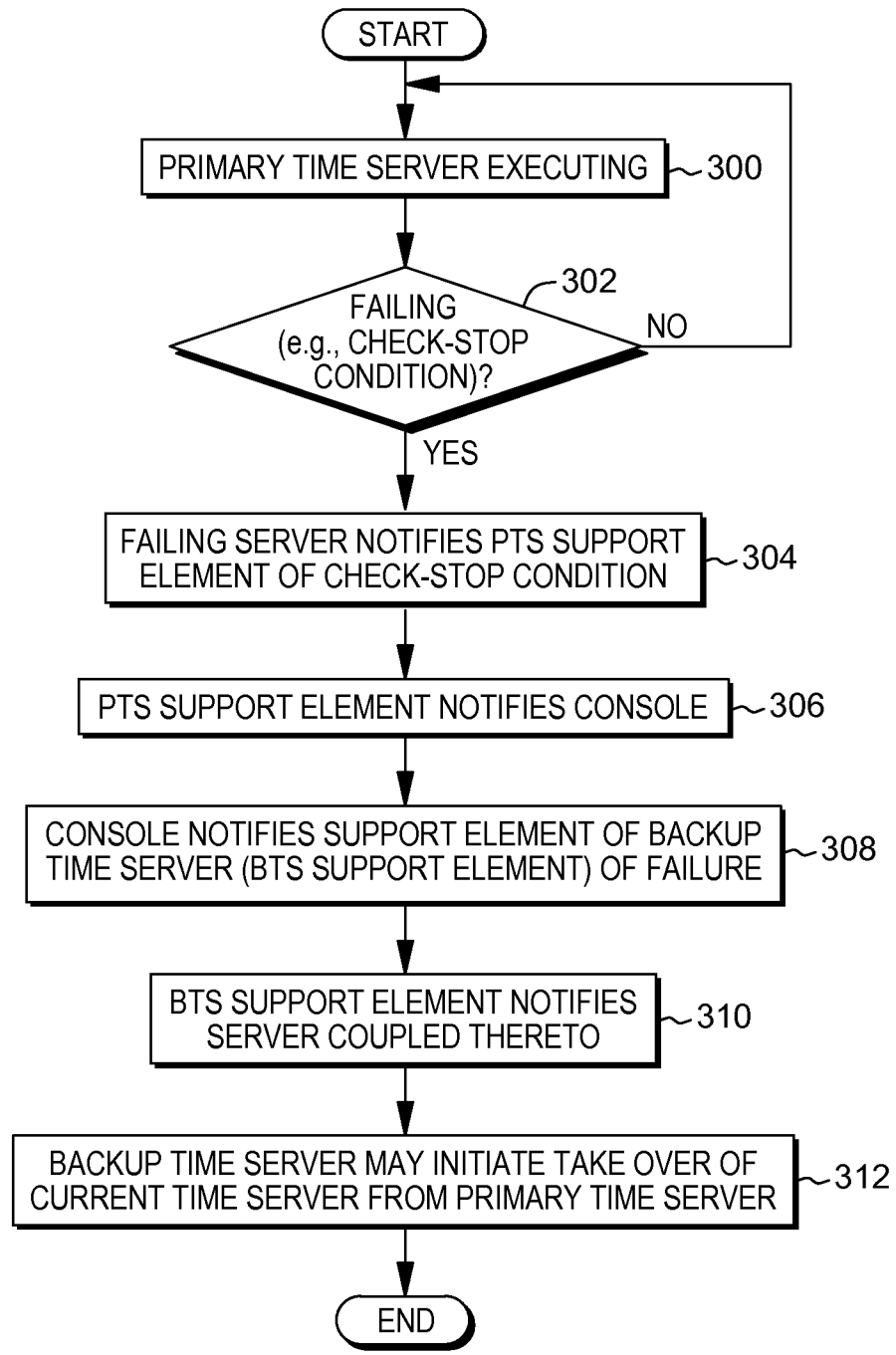
FIG. 3 depicts one embodiment of logic associated with enhanced console assisted recovery, in accordance with one or more aspects of the present invention.

Further details of an enhanced console assisted recovery procedure are described with reference to FIG. 3. Referring to FIG. 3, the primary time server, and in particular, server 104 is executing, STEP 300. Server 104 determines whether it has reached a failing condition from which it cannot recover, INQUIRY 302. If server 104 has not reached such a failing condition, then it continues to execute. However, if server 104 encounters a check-stop condition, server 104 notifies PTS support element 110 of its failure, STEP 304. The PTS support element receives the notification from server 104, and notifies hardware management console 108 of the failing condition of the primary time server, STEP 306. For example, PTS support element 110 sends a recovery request to the hardware management console. The console notifies the BTS support element of the failing primary time server, STEP 308. For instance, it forwards the recovery request to the BTS support element, provides an indication of the recovery request, or otherwise notifies the BTS support element of the failing primary time server. BTS support element 106 then notifies server 102 of the recovery request, STEP 310. Again, the BTS support element may forward the recovery request, send an indication of the recovery request or otherwise inform server 102 of the recovery request. The backup time server may then initiate takeover as the current time server, STEP 312.

In accordance with an aspect of the present invention, the console recovery path goes from a two-way path to a one-way path with the enhanced console assisted recovery. The primary time server proactively initiates recovery of the time serving function by the backup time server by initiating notification of its demise rather than waiting for the backup time server to determine that the primary time server has failed. There is almost no lag time between the system check-stop and the start of enhanced console assisted recovery processing. Since the request is generated from the primary time server prior to system logging, it avoids the potential of the recovery being delayed.

With one or more aspects of the invention, before the support element begins the data capture process, it will construct and send a message to its neighbors reporting the failure of the server. When the message is received by the backup time server from the primary time server, it will cause the backup time server to take over as the current time server (CTS) for the network. This will allow the takeover to happen much closer in time to the failure of the system, since it does not wait for multiple time outs before initiating recovery options.

As described herein, an efficient technique for communicating the failure of the primary time server to the backup time server is provided in order to provide fast failure recovery of a synchronized timing network with the intent of avoiding a complete network outage. The primary time server efficiently notifies the backup time server that the primary server is about to become unavailable. The backup time server can then begin an immediate takeover of time serving to the synchronized network.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
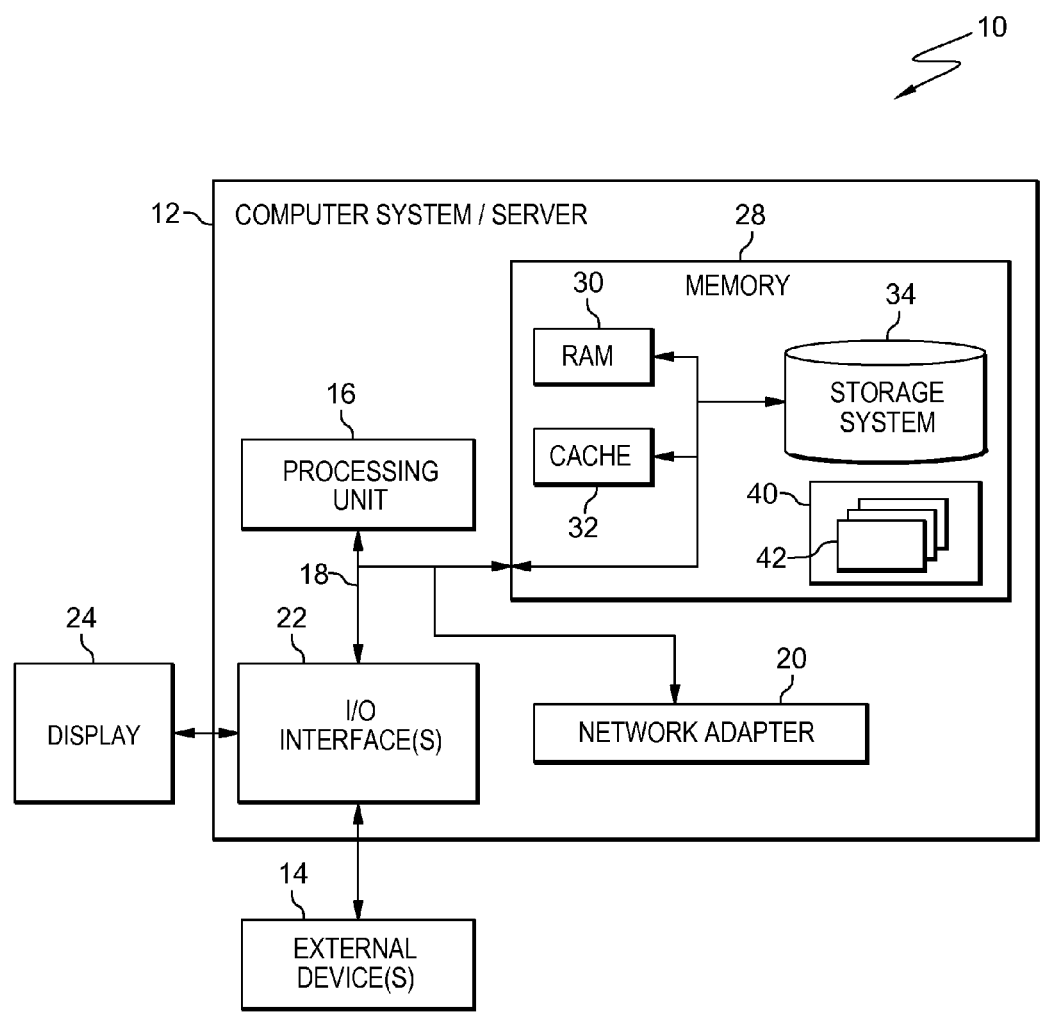
FIG. 4 depicts one embodiment of a cloud computing node.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
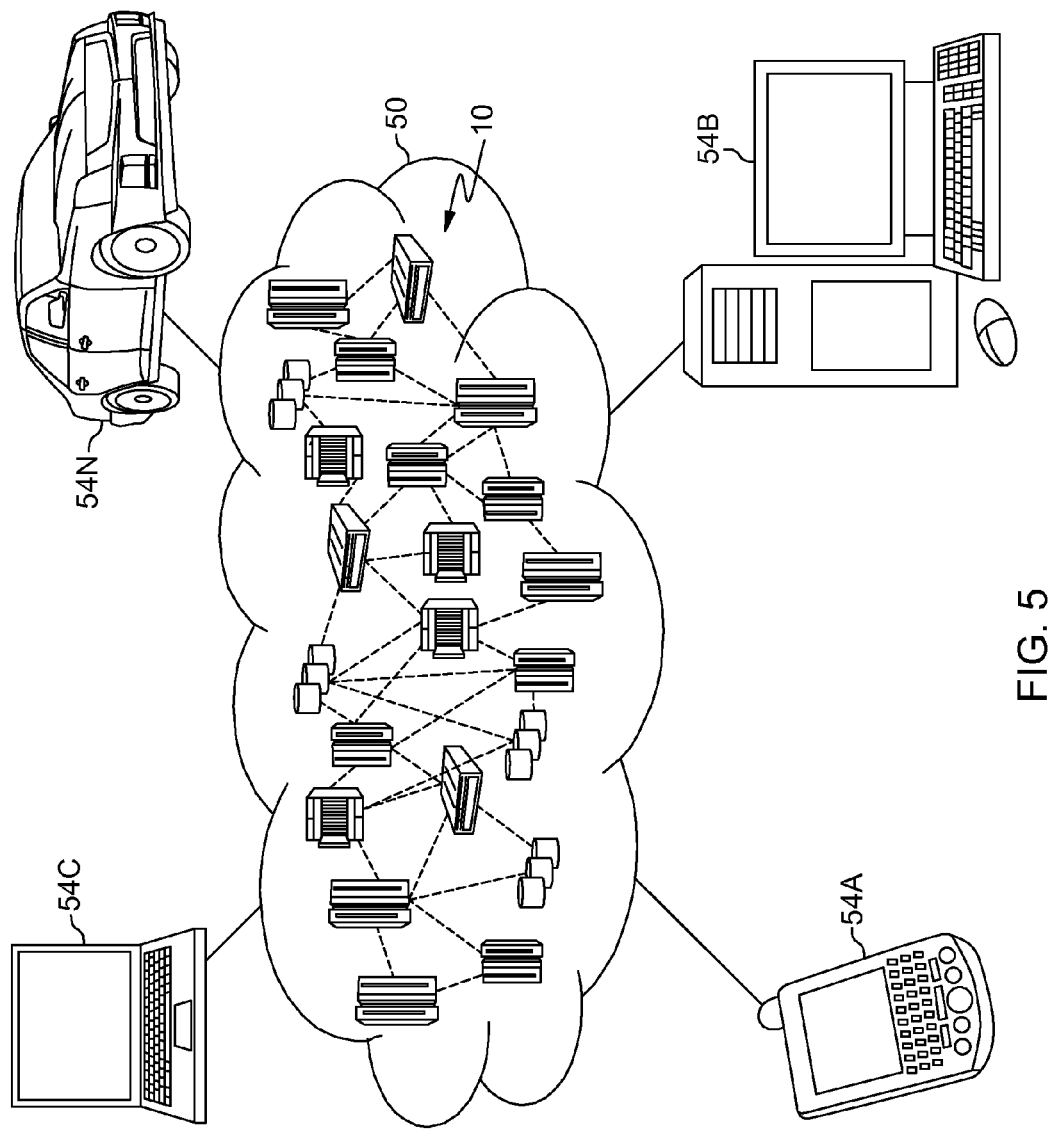
FIG. 5 depicts one embodiment of a cloud computing environment.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
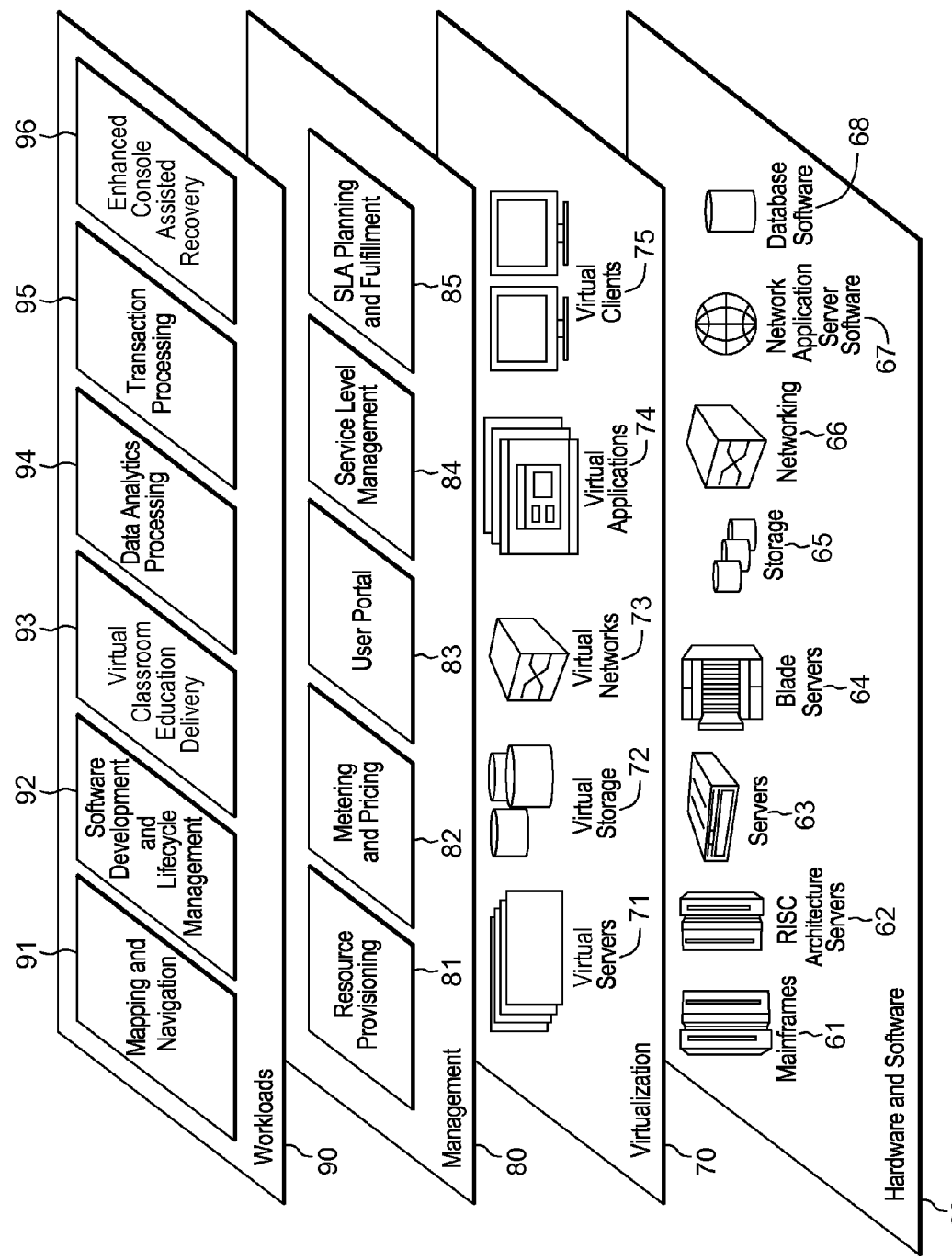
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced console assisted recovery 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating recovery in coordinated timing networks, the computer program product comprising:
   a non-transitory computer readable storage medium readable by a processing circuit and storing instructions for execution by the processing circuit for performing a method comprising:
      detecting, by a primary time server of a coordinated timing network, that it has reached a particular failure condition; and
      based on detecting the particular failure condition, proactively initiating by the primary time server notification of failure to a backup time server of the coordinated timing network;
      wherein the detecting by the primary time server the particular failure condition comprises:
         detecting by the primary time server that it has reached a check-stop condition;
         sending, by the primary time server, a notification to a support element of the primary time server of the check-stop condition at the primary time server; and
      wherein the proactively initiating notification of the failure includes providing from the support element of the primary time server to the backup time server an indication of the failing condition of the primary time server.

2. The computer program product of claim 1, wherein the providing the indication comprises providing the indication from the support element of the primary time server to a console coupled to the primary time server, the console to forward the indication to a support element of the backup time server, which is to forward the indication to a server of the backup time server.

3. The computer program product of claim 1, wherein the notification comprises a recovery request, the recovery request to include information relating to the failing primary time server.

4. The computer program product of claim 1, wherein the method further comprises:
   obtaining by the backup time server the notification; and
   based on obtaining the notification, determining by the backup time server whether to takeover as the current time server.

5. The computer program product of claim 1, wherein the primary time server is an exclusive source of time for the coordinated timing network.

6. The computer program product of claim 1, wherein the proactively initiating enables a takeover by the backup time server as an exclusive time source for the coordinating timing network absent an outage of the backup time server.

7. A computer system for facilitating recovery in coordinated timing networks, the computer system comprising:
   a memory; and
   a processor in communications with the memory, wherein the computer system is configured to perform a method comprising:
      detecting, by a primary time server of a coordinated timing network, that it has reached a particular failure condition;
      based on detecting the particular failure condition, proactively initiating by the primary time server notification of failure to a backup time server of the coordinated timing network;
      wherein the detecting by the primary time server the particular failure condition comprises:
         detecting by the primary time server that it has reached a check-stop condition;
         sending, by the primary time server, a notification to a support element of the primary time server of the check-stop condition at the primary time server; and
      wherein the proactively initiating notification of the failure includes providing from the support element of the primary time server to the backup time server an indication of the failing condition of the primary time server.

8. The computer system of claim 7, wherein the providing the indication comprises providing the indication from the support element of the primary time server to a console coupled to the primary time server, the console to forward the indication to a support element of the backup time server, which is to forward the indication to a server of the backup time server.

9. A method of facilitating recovery in coordinated timing networks, the method comprising:
   detecting, by a primary time server of a coordinated timing network, that it has reached a particular failure condition;
   based on detecting the particular failure condition, proactively initiating by the primary time server notification of failure to a backup time server of the coordinated timing network;
   wherein the detecting by the primary time server the particular failure condition comprises:
      detecting by the primary time server that it has reached a check-stop condition;
      sending, by the primary time server, a notification to a support element of the primary time server of the check-stop condition at the primary time server; and
   wherein the proactively initiating notification of the failure includes providing from the support element of the primary time server to the backup time server an indication of the failing condition of the primary time server.

10. The method of claim 9, wherein the providing the indication comprises providing the indication from the support element of the primary time server to a console coupled to the primary time server, the console to forward the indication to a support element of the backup time server, which is to forward the indication to a server of the backup time server.

\* \* \* \* \*